United States Patent
Ueyama et al.

(10) Patent No.: US 10,621,772 B2
(45) Date of Patent: Apr. 14, 2020

(54) IDEA SUPPORT IMAGE DISPLAY METHOD AND MEDIUM

(71) Applicant: HONDA MOTOR CO., LTD., Tokyo (JP)

(72) Inventors: Masaki Ueyama, Wako (JP); Yusuke Okutani, Kamakura (JP); Ryosuke Sakuma, Kamakura (JP); Yamato Honda, Kawasaki (JP); Keita Kobayashi, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 16/059,290

(22) Filed: Aug. 9, 2018

(65) Prior Publication Data

US 2019/0057535 A1    Feb. 21, 2019

(30) Foreign Application Priority Data

Aug. 17, 2017 (JP) .................................. 2017-157611

(51) Int. Cl.

| | |
|---|---|
| *G06T 13/80* | (2011.01) |
| *G06T 11/60* | (2006.01) |
| *G06T 11/00* | (2006.01) |
| *G06T 7/194* | (2017.01) |
| *G06F 16/9535* | (2019.01) |

(52) U.S. Cl.
CPC .......... *G06T 13/80* (2013.01); *G06F 16/9535* (2019.01); *G06T 11/001* (2013.01); *G06T 11/60* (2013.01)

(58) Field of Classification Search
CPC ....... G06T 13/80; G06T 11/60; G06T 11/001; G06T 7/90; G06T 7/194; G06T 2207/20212; G06T 2207/20221; G06T 11/40; G06F 16/438; G06F 16/434; G06F 16/50; G06F 16/95; G06F 16/953; G06F 16/9535; H04N 1/60; H04N 2201/0089

See application file for complete search history.

(56) References Cited

U.S. PATENT DOCUMENTS

| | | | | |
|---|---|---|---|---|
| 2013/0135339 | A1* | 5/2013 | Saini | ....................... G09G 5/024 345/613 |
| 2014/0074453 | A1* | 3/2014 | Katsuno | ................ G06F 16/438 704/2 |
| 2014/0253584 | A1* | 9/2014 | Harper | .................... G06T 11/60 345/611 |
| 2016/0352971 | A1* | 12/2016 | Kanematsu | .............. H04N 1/60 |

FOREIGN PATENT DOCUMENTS

JP          2009-026108 A        2/2009

* cited by examiner

*Primary Examiner* — Ke Xiao
*Assistant Examiner* — Andrew Shin
(74) *Attorney, Agent, or Firm* — Thomas | Horstemeyer, LLP

(57) ABSTRACT

A first region including an input first word and having a first background color and a second region including a second word decided independently of the first word and having a second background color are collided with each other on a screen, and a third region in which the two collided regions fuse with each other is displayed. At the same time, the first word and the second word are displayed as if they were continuous words in the third region. This is displayed as a moving image with a continuous motion.

4 Claims, 6 Drawing Sheets

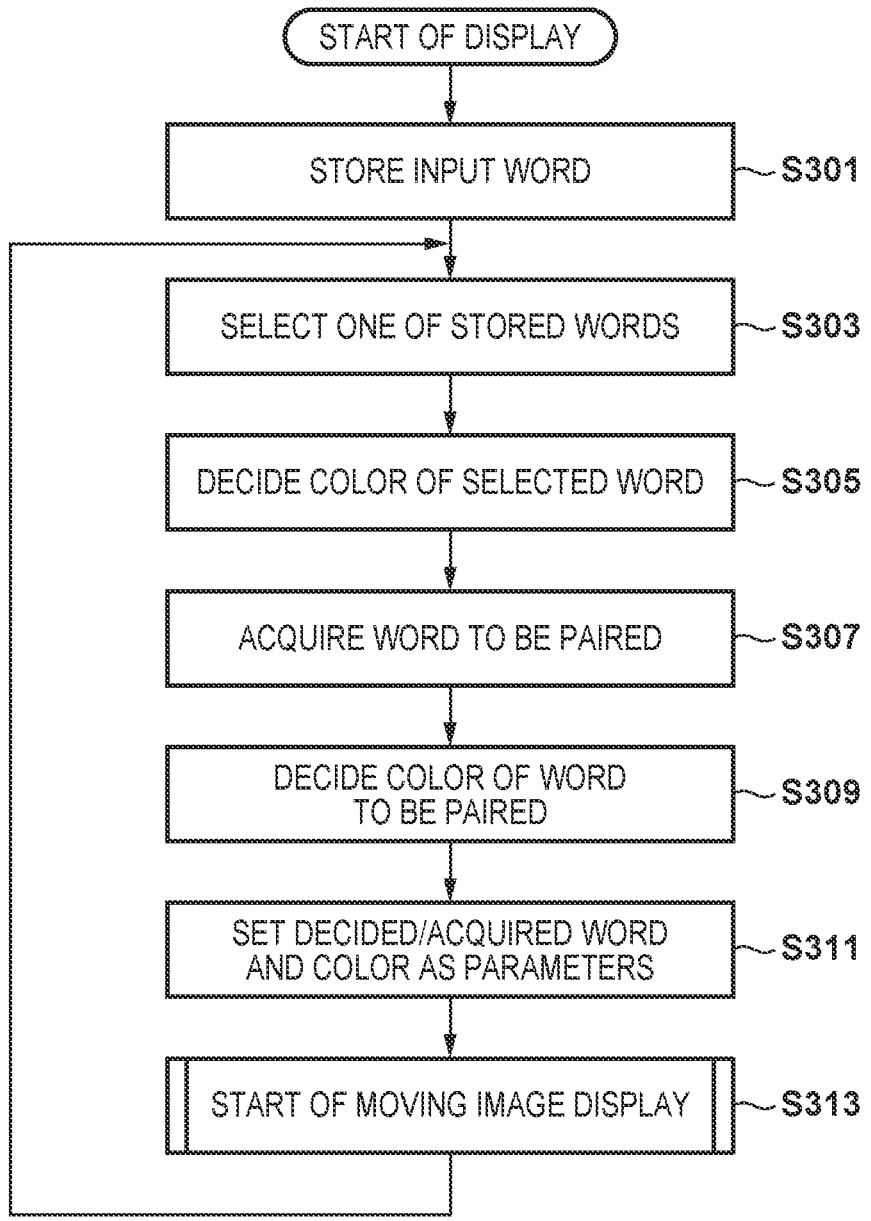

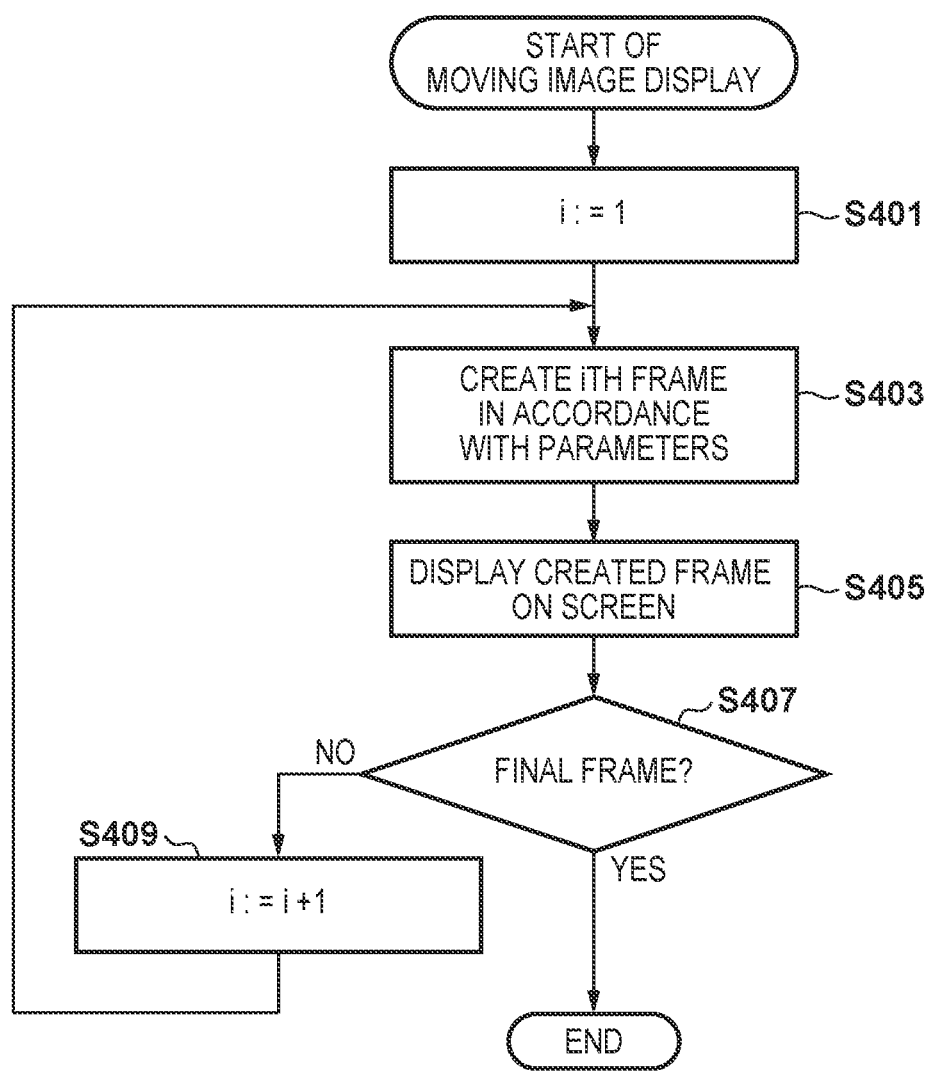

IDEA SUPPORT IMAGE DISPLAY METHOD AND MEDIUM

BACKGROUND OF THE INVENTION

Field of the Invention

The present invention relates to an idea support image display method that, for example, visually supports an idea of a person, or the like.

Description of the Related Art

An apparatus that presents two types of words acquired from different viewpoints or information sources to a user and supports an idea of the user has been conventionally developed. In particular, Japanese Patent Laid-Open No. 2009-26108 discloses an idea support apparatus that extracts a first keyword associated with context formation words appearing adjacent to each other from words extracted based on the speech of a conference recorded by a speech recording apparatus, acquires a character string including the context formation words from the outside, extracts a second keyword in the same way as the first keyword, and presents the keywords.

In the technique described in Japanese Patent Laid-Open No. 2009-26108, however, each presented keyword is a keyword extracted based on the association with the character string as the base, and the apparatus only supports an idea consistent with the subject or gist of the conference. That is, the apparatus aims at widening the idea of a participant within the scope of the subject or gist of the conference, but does not guide the user to an intuitive and unconventional unrestricted idea. In addition, since a keyword or an image is presented, the appeal to visual sensors is poor.

SUMMARY OF THE INVENTION

The present invention provides an idea support program configured to visually support an intuitive and unrestricted idea of a user.

The present invention has the following arrangement.

According to an aspect of the present invention, there is provided a non-transitory computer-readable storage medium recording an idea support program which is executed by a computer to cause the computer to execute: deciding a first word and a second word; assigning a first background color to the first word and assigning a second background color to the second word; executing first display for displaying the first word with the first background color and the second word with the second background color; and executing second display for displaying the first word and the second word with a third background color different from the first background color and the second background color after the first display.

According to the present invention, it is possible to visually support an intuitive and unrestricted idea of a user.

Further features of the present invention will become apparent from the following description of exemplary embodiments with reference to the attached drawings.

BRIEF DESCRIPTION OF THE DRAWINGS

FIG. 3 is a flowchart of display processing by the idea support apparatus;

FIG. 4 is a flowchart of display processing by the idea support apparatus; and

DESCRIPTION OF THE EMBODIMENTS

Idea Support System

Figure 1A:
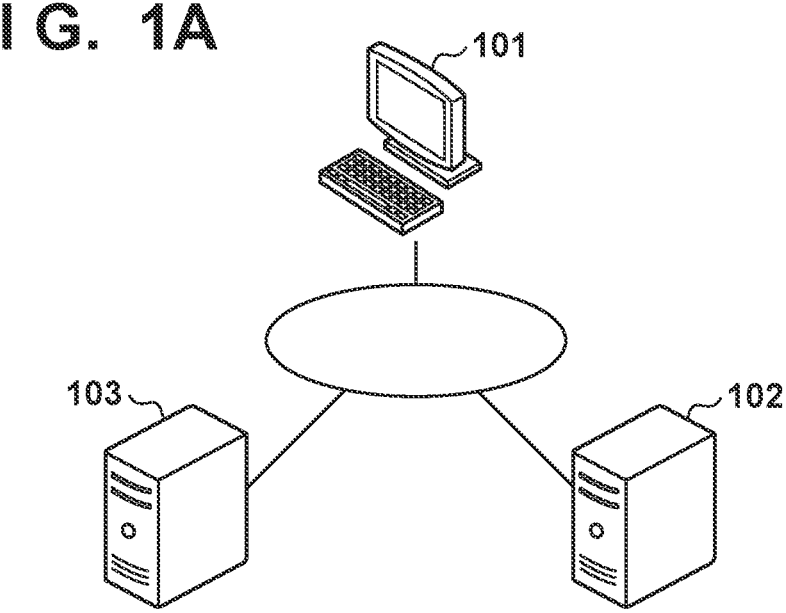
FIG. 1A is a view showing the arrangement of an idea support apparatus according to an embodiment.

FIG. 1A shows the arrangement of an idea support system according to this embodiment. An idea support apparatus 101 is implemented by, for example, executing an idea support program by a computer. The idea support apparatus 101 is connected to, for example, the Internet, and can be connected to various web servers 102 via the Internet, and can access services provided by the servers, for example, services such as providing a document or an image corresponding to a keyword. The idea support apparatus 101 is also connected to a dictionary server 103 via the Internet. The dictionary server 103 returns an appropriate word in response to a request from the idea support apparatus 101. Note that the idea support apparatus 101 can also acquire a word not from the dictionary server 103 but by accessing various servers such as a web server. In addition, the idea support apparatus 101 and the dictionary server 103 may be formed on the same server. Furthermore, the idea support apparatus 101 and the dictionary server 103 may be formed on a so-called cloud server.

Figure 1B:
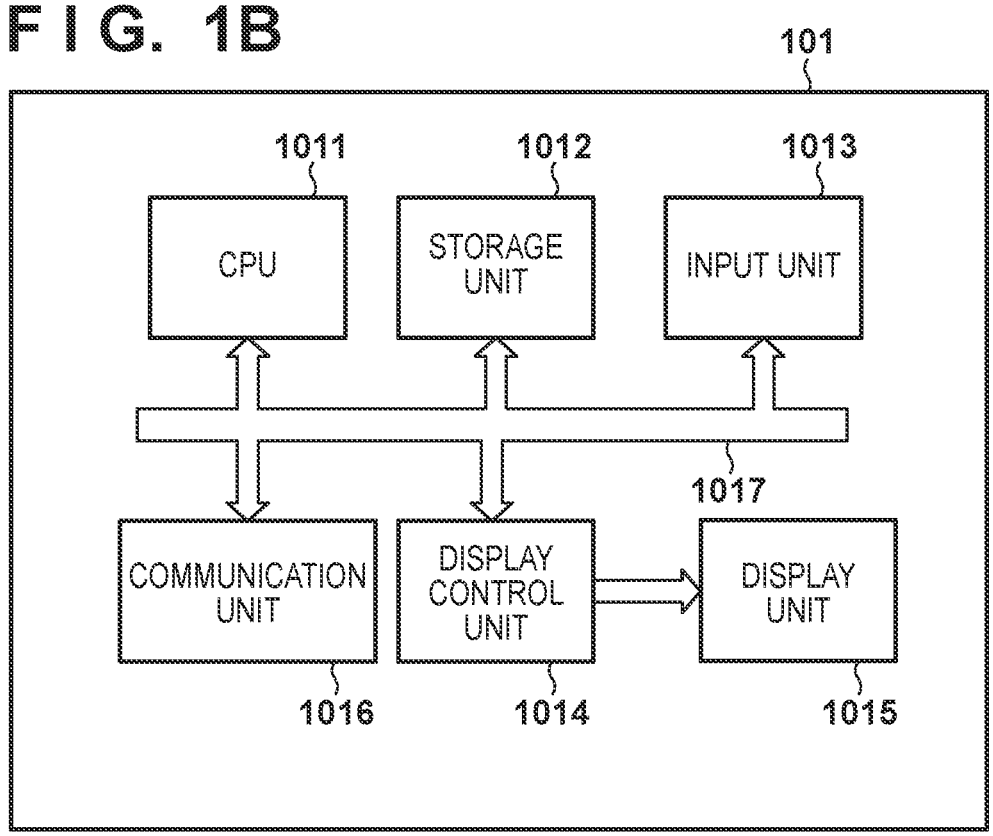
FIG. 1B is a block diagram showing the arrangement of a computer functioning as the idea support apparatus.

FIG. 1B is a block diagram showing the arrangement of a computer functioning as the idea support apparatus 101. The idea support apparatus 101 need only have the arrangement of a general-purpose computer. In this example, the idea support apparatus 101 includes a CPU 1011, a storage unit 1012 including a RAM and a secondary storage device configured to store programs and data, and an input unit 1013 used by an operator to input a word or the like. In addition, the idea support apparatus 101 includes a communication unit 1016 for connection to the Internet or the like, and a display control unit 1014 configured to control display on a display unit 1015. The CPU 1011 executes, for example, a program of a procedure shown in FIG. 3 or 4, which is stored in the storage unit 1012, draws each frame of an animation (moving image), and causes the display unit 1015 to display it via the display control unit 1014. A moving image is thus displayed.

Functional Block Diagram of Idea Support Apparatus

Figure 2:
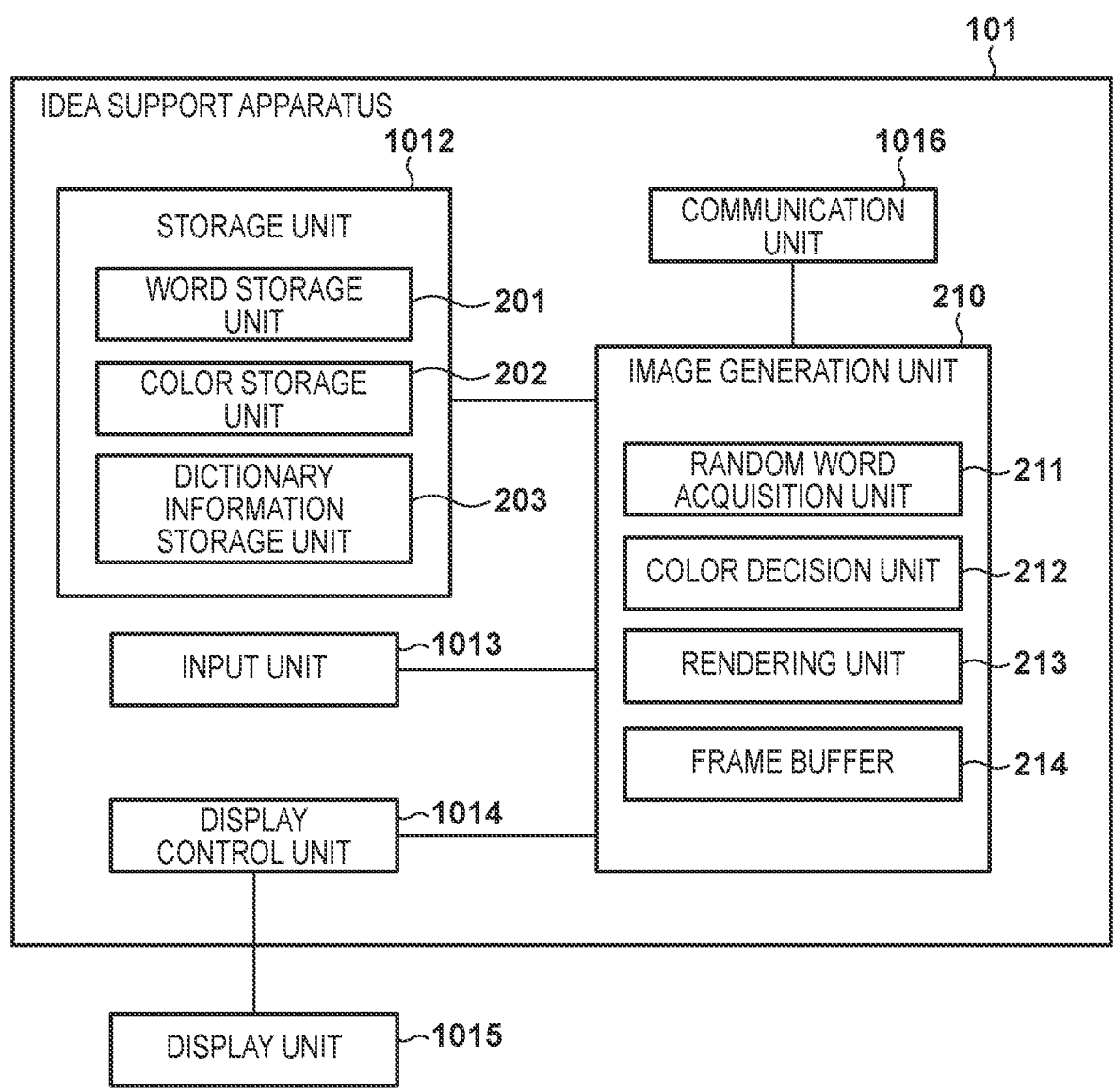
FIG. 2 is a functional block diagram of the idea support apparatus according to the embodiment.

FIG. 2 shows the functional blocks of the idea support apparatus 101. The storage unit 1012 includes a word storage unit 201, a color storage unit 202, and a dictionary information storage unit 203. The word storage unit 201 stores two words, that is, a first word input by the user via the input unit 1013, and a second word arbitrarily (or randomly) selected by the idea support apparatus 101. The color storage unit 202 stores a first background color and a second background color decided in association with the words. The color storage unit 202 also stores a third background color associated with a combined word formed by combining the first word and the second word. The dictionary information storage unit 203 stores information used to specify dictionary information usable to decide the second word. The dictionary information storage unit 203 may store, for example, the URL of the dictionary server 103, or the location (for example, a URI) of information such as a web service on the Internet, which is usable to decide the second word.

An image generation unit 210 is a processing block configured to generate an idea support animation, and includes a random word acquisition unit 211, a color decision unit 212, a rendering unit 213, and a frame buffer 214. The random word acquisition unit 211 acquires the second word using the information stored in the dictionary information storage unit 203 and stores it in the word storage unit 201. The color decision unit 212 decides the first background color and the second background color associated with the first word and the second word, respectively. The color decision unit 212 also decides the third background color based on the first background color and the second background color. Pieces of information representing the decided colors are stored in the color storage unit 202. The rendering unit 213 renders each frame of the idea support animation using the decided first word and the first background color, the second word and the second background color, and the third background color. The rendered frames are stored in the frame buffer 214 and displayed at a predetermined time interval by the display unit 1015 via the display control unit 1014. A plurality of frame buffers 214 may be provided such that when an image in one frame buffer is being displayed, rendering is performed using another frame buffer as an off-screen buffer.

FIG. 3 is a flowchart of a procedure until display of the idea support animation according to this embodiment. This flowchart is executed by the CPU 1011. However, from the functional viewpoint, one of the functional blocks shown in the image generation unit 210 in FIG. 2 can be regarded as the subject for each step. Referring to FIG. 3, first, when the user inputs one or more words as the candidates of the first word, the words are stored in the word storage unit 201 (step S301). Next, one word is selected from the stored words as the first word (step S303), and the color decision unit 212 decides the first background color that is the color of the selected first word (step S305). Here, the first background color is a color recalled from, or associated with the first word. As for the recalled or associated color (to be referred to as the recalled color), for example, an image search is performed on the Internet using the first word as a keyword, and the representative color of an obtained image is decided as the color. As for the representative color, for example, the appearance frequency of each pixel in the image is obtained, and the color of the highest appearance frequency is obtained as the recalled color. This also applies to the second word and the second background color to be described later.

Next, the random word acquisition unit 211 acquires a word as the second word (step S307). As described above, acquisition of the second word is performed using the information stored in the dictionary information storage unit 203. Since the second word is assumed to be decided at random, for example, pieces of information representing a plurality of reference destinations may be stored in the dictionary information storage unit 203, and the second word may be acquired from a reference destination randomly selected from them. When a sentence or the like including a plurality of words is acquired from the reference destination, the sentence may be parsed and decomposed to words, and one word may be selected at random from the obtained words. In addition, the second word may be identical to the first word. If the words are identical, the second word may be reacquired. When the second word is decided, the color decision unit 212 decides the second background color associated with the second word (step S309). The second background color can be a color recalled from or associated with the second word. If the second background color is similar to the first background color, the second background color may be decided again. Similar colors can be defined as, for example, colors for which the distance between the colors expressed by the three primary colors is a predetermined value or less.

Next, the first word, the second word, the first background color, the second background color, and the third background color acquired are set as parameters (step S311), and the rendering unit 213 is caused to execute moving image display processing (step S313). When the moving image display processing ends, the process returns to step S303 to select a new first word and repeat moving image display. Note that this processing can be interrupted by the user at an arbitrary timing and, at that time, a new word can be input as the first word.

FIG. 4 shows the moving image display processing of step S313. First, an initial value of 1 is set as a variable i representing a frame number (step S401). Next, the i-th frame is created using the words and the background colors designated by the parameters set in step S311 (step S403). The created frame is displayed on the screen (step S405). It is determined whether the displayed frame is the final frame of a series of frames constituting the moving image (step S407). If it is determined that the frame is not the final frame, the variable i is incremented by one, and the processing is executed for the next frame from step S403. On the other hand, if it is determined that the frame is the final frame, the moving image display processing ends.

Example of Animation

FIGS. 5A to 5M show an example of an animation displayed in accordance with the procedures shown in FIGS. 3 and 4. The individual drawings show 13 sampled frames of a series of frames. To smoothly display the moving image, frames used to smoothly connect these frames are further needed. In this embodiment, all such necessary frames are generated and displayed, but some frames are omitted.

Figure 5A:
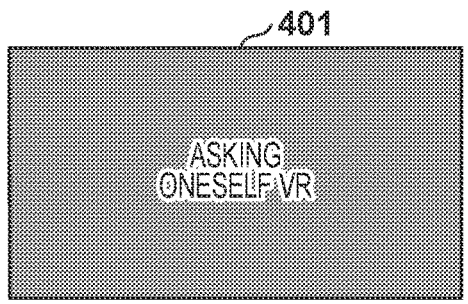
FIGS. 5A to 5M are views showing an example of display by the idea support apparatus.

First, a start screen having an even initial background color 401 on the entire screen is displayed (FIG. 5A). The initial background color can be a color determined in advance or may be a color designated by the user. Additionally, in this example, a title character string (e.g., "ASKING ONESELF VR") is displayed on the start screen. However, the title character string may be absent. The title character string may be a preset character string or may be a character string designated by the user. If an idea support animation is displayed immediately before, the final frame of the idea support animation becomes the start screen of the next idea support animation.

Figure 5B:
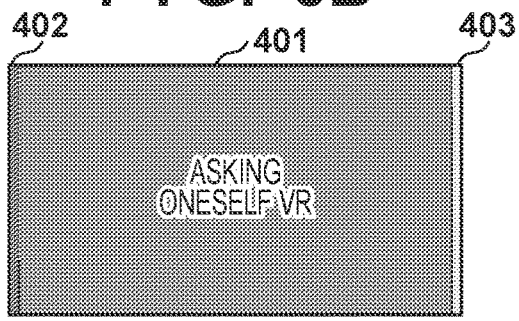
Figure 5C:
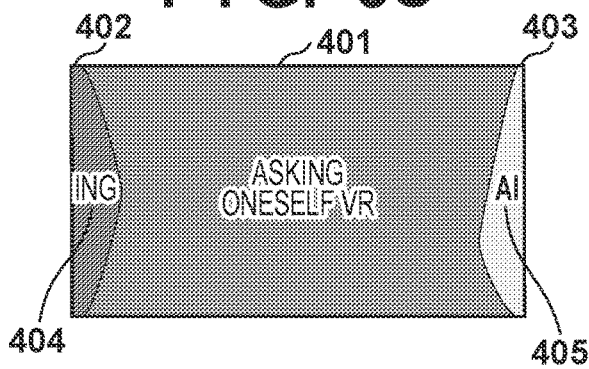
Figure 5D:
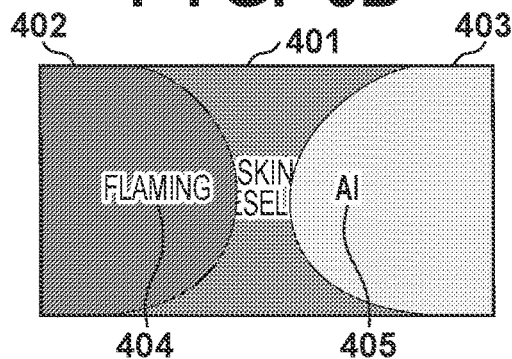
Figure 5E:
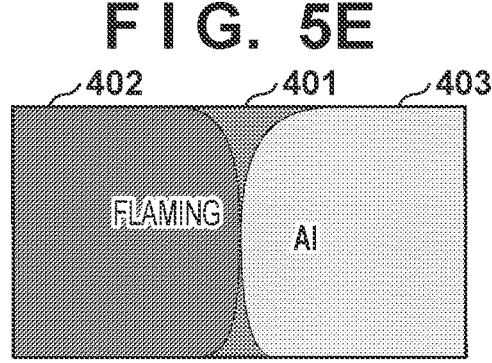

After the start screen, a region (first region 402) of the first background color and a region (second region 403) of the second background color are displayed in a vertically long strip shape at the left and right ends of the screen (FIG. 5B). At this time, the first word and the second word are not displayed because they are arranged in the first region 402 and the second region 403 outside the display screen. As for the position of each word, each word is located near the center concerning the vertical direction and near the boundary of the region inside the screen concerning the horizontal direction. Next, a first word 404 (e.g., "FLAMING") and a second word 405 (e.g., "AI") located outside the screen start moving in different directions so as to collide against each other (in this example, from the left and right sides to the center). When the words enter the display screen, they are displayed. At the same time, the regions of the background colors of the words also expand (or move) toward the center (FIG. 5C (FIG. 5D)). Here, the words need not have the same font or size. However, the sizes may be the same (or almost the same). Then, the first word 404 and the second word 405 collide, and the first region 402 and the second region 403 collide (FIG. 5E). The time required for the moving image from the start of expansion of the first region 402 and the second region 403 to the collision can be about 1 sec in this example.

Figure 5F:
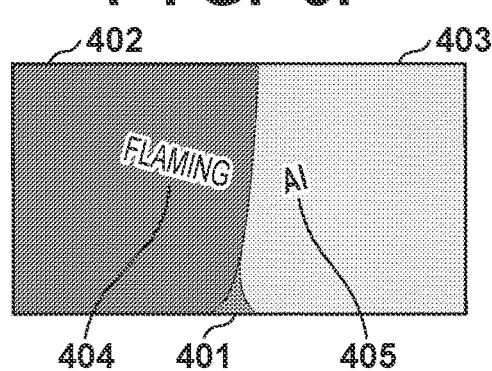
Figure 5G:
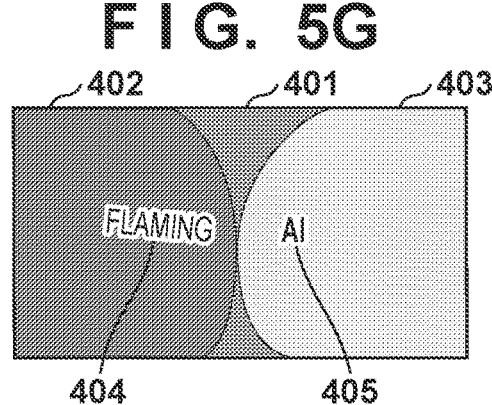
Figure 5H:
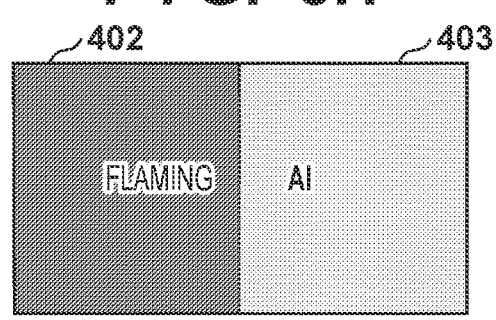

Here, at the time of collision, a presentation is done such that each region has behavior like an elastic body, and as if each word is embedded in the region of the corresponding background color. This presentation expresses a bounce in collision. That is, for example, the force of collision makes the first region 402 and the second region 403 push against each other, and the boundary portion becomes an organic curve. In addition, as the background regions push against each other, the alignments of characters in the first word 404 and the second word 405 tilt inward (that is, to the sides of the counterparts of the collision) (FIG. 5F). After that, the first region and the second region that have collided repel each other and temporarily separate. The first word and the second word also temporarily separate following the corresponding regions (FIG. 5G). Although the regions temporarily separate, their expansion (or movement) toward the center continues. The first region 402 and the second region 403 contact again without bounce at this time. The regions expand until the screen is divided into two parts by the first region 402 and the second region 403 with the central portion as the boundary. In this state, the first word 404 and the second word 405 are arranged in the corresponding regions while keeping such a distance that does not allow them to seem to be one word (FIG. 5H).

Figure 5I:
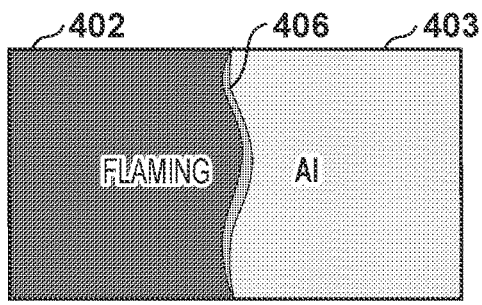
Figure 5M:
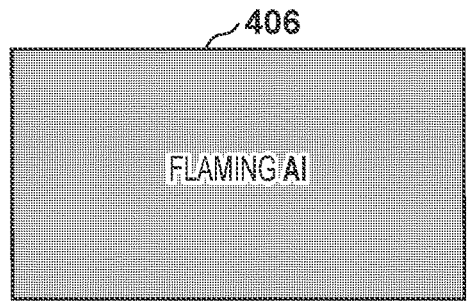
Figure 5J:
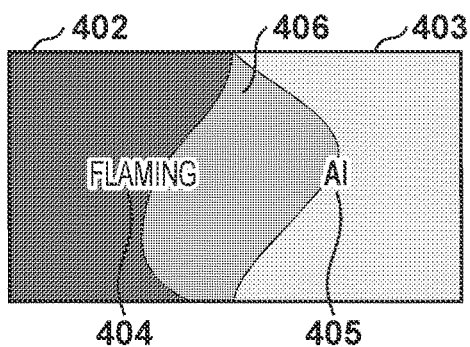
Figure 5K:
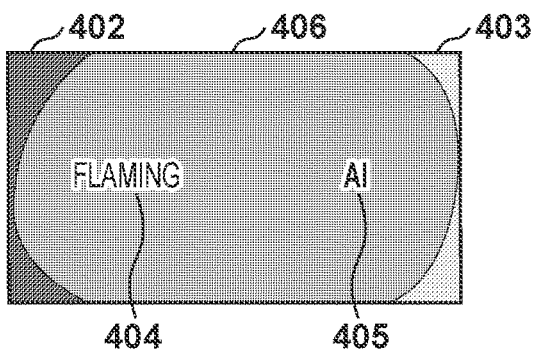

When the first region and the second region contact, a region (third region) 406 having the third background color appears on the boundary between the first region 402 and the second region 403 (FIG. 5I. The third region 406 that appears is not linear but a wavy region in this example. Here, the third background color is the mixture of the first background color and the second background color. The mixing of colors can be either additive color mixture or subtractive color mixture. For this reason, the third region 406 looks as if it were a region in which the first region 402 and the second region 403 fuse with each other rather than a region completely different from the first region 402 and the second region 403. The third region 406 that appears expands from the central portion to the left and right sides (FIGS. 5J and 5K). Along with this, the first word 404 and the second word 405 move in the directions to separate from each other but do not come out of the display screen.

Figure 5L:
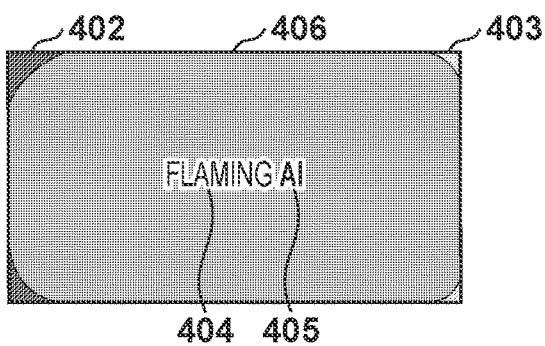

After that, when the third region expands so as to almost occupy the entire screen, the first word 404 and the second word 405 move toward the center so as to approach each other and are displayed such that they seem to be one connected word (FIG. 5L). However, the font and the size are not changed. The entire screen is occupied by the third region 406 (FIG. 5M), and this becomes the initial screen for the next animation. The time needed from the start to the end of the animation is about 4 sec. However, the speed is changed on a scene basis for the presentation effect. For example, the animation rapidly progresses in a short time from the screen of FIG. 5C to FIG. 5E or from FIG. 5I to FIG. 5K, and relatively slowly progresses from FIG. 5A to FIG. 5B or from FIG. 5K to FIG. 5M. However, the movement of the first word and the second word from FIG. 5K to FIG. 5M is performed quickly as compared to the movement of their regions.

In the above-described way, a moving image presented as if two words and their regions collided and integrated is displayed. This visually expresses integration of two concepts represented by the two words and their regions (particularly colors), and can inspire the user who sees this and guide him/her to a new idea.

As the second word, a word that is not particularly relevant to the first word is selected at random. This expands the width of the idea, and the word is not limited to a word connected to a specific concept.

In addition, a background color is connected to each word, and the user is promoted to make a new idea by the colors.

Note that the above-described time, speed, and presentation aim at enhancing the visual effect for expressing the integration of two concepts represented by the two words and their regions, and are not limited to the above-described examples, and various variations are also possible.

Additionally, selection of the second word is not limited. However, depending on the environment (for example, a user who has a chance to see a moving image) to display a moving image, filtering of words inappropriate for the display may be performed.

In addition, the first word is input by the user. As for the input method, a character string may directly be input using a keyboard or the like, or a word may be extracted as the first word from a designated document or sentence. Alternatively, a desired situation (or a scene (travel, cooking, or the like)) may be set, and a term recalled from the situation may be decided as the first word. For example, when a word representing a scene is input, the word is searched for on the Internet. A word is extracted from the obtained result as the first word.

Once a background color recalled from the first word or the second word is decided, the word and the color may be stored in association and reused to decide a background color in a case in which the first word or the second word is decided. In addition, as a color recalled from a word, a color of the highest appearance frequency in an image obtained by a search using the word as a keyword is used, as described above. At this time, colors of frequencies in predetermined ranks, for example, second and third ranks from the highest frequency may be stored in association with the word. Then, when deciding the first background color or the second background color, not only the color of the highest frequency but also colors in lower ranks may be selected sequentially or at random. This can shorten the processing time needed for the decision of the background color and also prevent the association between a word and a color from being fixed.

Furthermore, the first background color and the second background color may be decided, for example, at random independently of the first word and the second word. In this case, the above-described association between a word and a color need not be stored.

This embodiment can be implemented not only by software but also, for example, a circuit such as an ASIC. As for creation of an animation, the animation can be described using a general-purpose programming language such as Java® or can be created using various kinds of animation software.

Note that the technical scope of the present invention is not limited to the above-described embodiment, and various changes and modifications of the above-described embodiment are included without departing from the scope of the present invention. That is, the arrangement of the above-described embodiment is merely an example and can appropriately be changed.

Summary of Embodiment

The above-described embodiment is summarized as follows.

(1) There is provided a non-transitory computer-readable storage medium recording an idea support program which is executed by a computer to cause the computer to execute:
deciding a first word and a second word;
assigning a first background color to the first word and assigning a second background color to the second word;
executing first display for displaying the first word with the first background color and the second word with the second background color; and p executing second display for displaying the first word and the second word with a third background color different from the first background color and the second background color after the first display.

With the above-described arrangement, the idea of a user can be supported by visualizing a state in which the two words are different and a state in which the two words fuse.

(2) In the non-transitory computer-readable storage medium according to (1), the first display includes an animation in which the first word with the first background color and the second word with the second background color move in different directions and collide against each other, and the second display includes an animation in which after the collision of the first word and the second word, a region of the third background color expands from a boundary portion between the first background color and the second background color.

With the above-described arrangement, a presentation to fuse the two words is made by the animation in which the two words fuse into one color after collision, and this facilitates idea support for the user.

(3) In the non-transitory computer-readable storage medium according to (1), as the first background color and the second background color, colors recalled from the first word and the second word are set.

With the above-described arrangement, the colors recalled from the words are set, thereby facilitating more intuitive idea support for the user.

(4) In the non-transitory computer-readable storage medium according to (3), the computer is connected to the Internet, and the colors recalled from the first word and the second word are set from representative colors of images each obtained by an image search on the Internet using each word as a key.

With the above-described arrangement, it is possible to easily set the colors recalled from the words using an existing technique.

(5) In the non-transitory computer-readable storage medium according to (1), the third background color is a color obtained by mixing the first background color and the second background color by one of subtractive color mixture and additive color mixture.

With the above-described arrangement, the two colors naturally mix with each other, thereby preventing the user from feeling discomfort.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-157611, filed Aug. 17, 2017, which is hereby incorporated by reference wherein in its entirety.

What is claimed is:

1. A non-transitory computer-readable storage medium recording an idea support program which is executed by a computer to cause the computer to execute:
   deciding a first word and a second word;
   assigning a first background color to the first word and assigning a second background color to the second word;
   executing first display for displaying the first word with the first background color and the second word with the second background color; and
   executing second display for displaying the first word and the second word with a third background color different from the first background color and the second background color after the first display,
   wherein the first display includes an animation in which the first word with the first background color and the second word with the second background color move in different directions and collide against each other, and
   the second display includes an animation in which after the collision of the first word and the second word, a region of the third background color expands from a boundary portion between the first background color and the second background color.

2. The medium according to claim 1, wherein as the first background color and the second background color, colors recalled from the first word and the second word are set.

3. The medium according to claim 2, wherein the computer is connected to the Internet by executing the idea support program, and
   the colors recalled from the first word and the second word are set from representative colors of images each obtained by an image search on the Internet using each word as a key.

4. The medium according to claim 1, wherein the third background color is a color obtained by mixing the first background color and the second background color by one of subtractive color mixture and additive color mixture.

* * * * *